July 3, 1951  P. GREEN  2,558,899
METHOD OF BLANCHING NUTS
Filed July 1, 1949  2 Sheets-Sheet 1
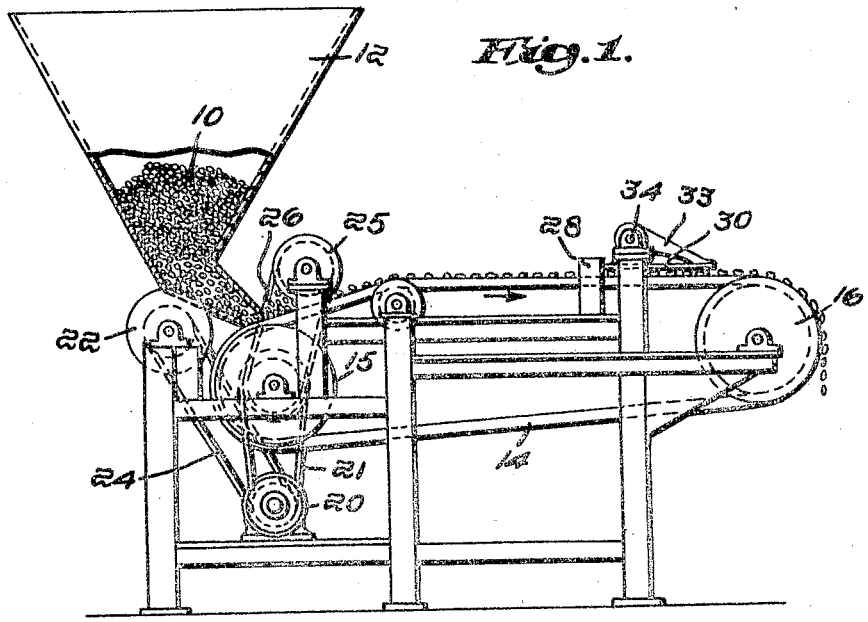
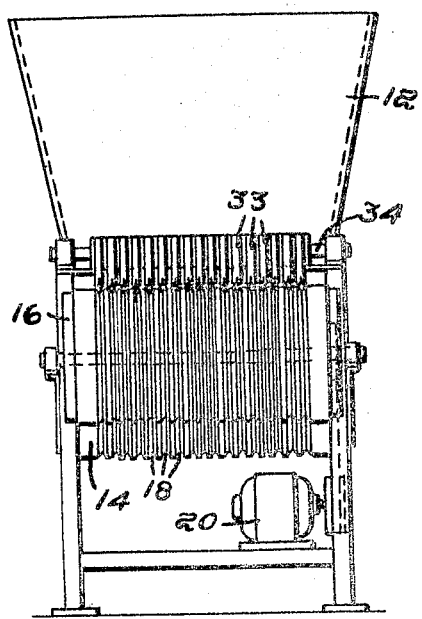
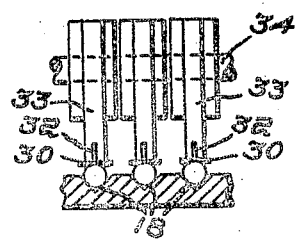
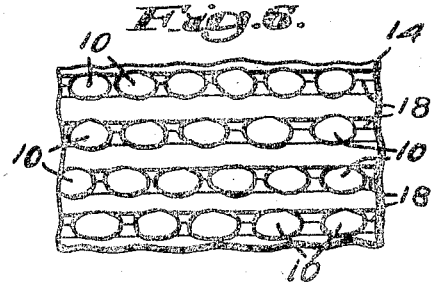
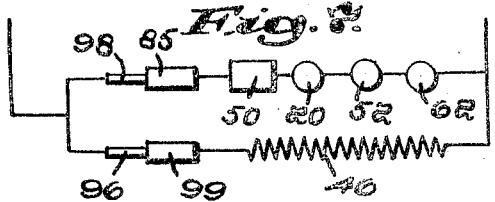
Inventor:
Philip Green,
by Kenway, Jenney, Witter & Hildreth
Attorneys

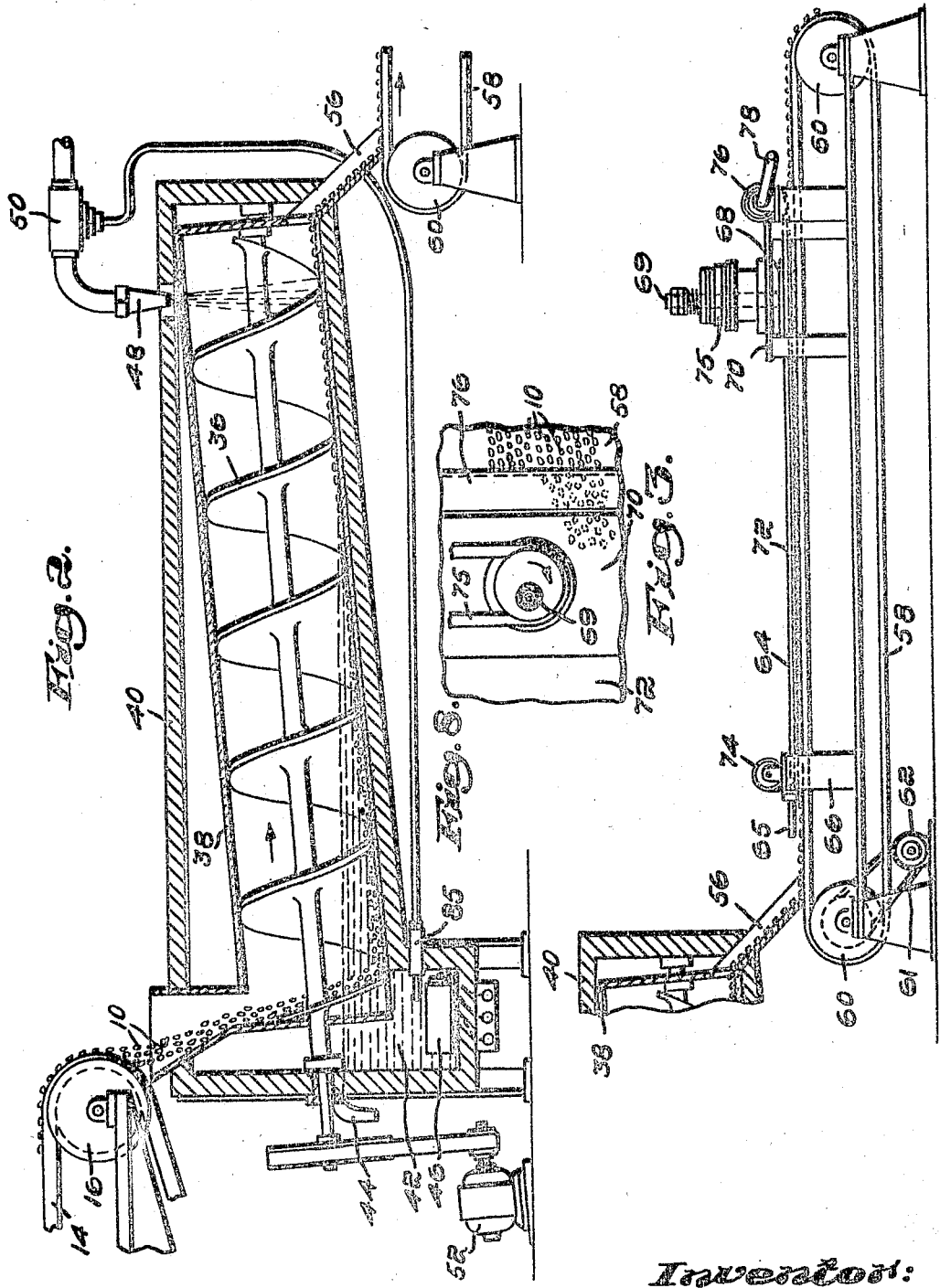

Patented July 3, 1951

2,558,899

UNITED STATES PATENT OFFICE 2,558,899

METHOD OF BLANCHING NUTS

Philip Green, Seabrook, N. H., assignor to Seabrook Associates, Tyrone, Pa., a partnership Application July 1, 1949, Serial No. 102,496

2 Claims. (Cl. 146—230)

This application is a continuation of my copending application Serial No. 39,211 filed July 17, 1948 and covering the apparatus. The invention in this application relates to an improved and novel method of blanching peanuts and the like, i. e. removing the skins from shelled nuts. The steps performed include slitting of the skins from end to end of the nuts, scalding of the nuts to loosen the skins and thereafter removing the hulls from the nuts. The primary object of the invention resides in the production of an improved method of performing this operation.

The removal of the skins from the nuts is greatly facilitated and with less damage to the nuts when the skins are slitted from end to end, and I have discovered that this slitting can be done most efficiently by arranging the nuts in continuous rows and continuously passing them thus arranged in contact with slitting knives which thereupon slit the skins from end to end as the nuts pass the knives. While the skins can be slitted either before or following the scalding operation, I preferably first slit the skins dry prior to scalding and in that case the nuts are slitted and then conducted through a scalding bath to loosen the skins. In accordance with the invention, the bath is automatically maintained at a predetermined scalding temperature and the nuts are subjected to the bath for the minimum time necessary to penetrate and loosen the skins without penetrating and soaking the nuts.

The scalding treatment preferably includes the spraying of the nuts with hot water which aids in removing any loose particles and providing a clean product. The final step of the process comprises a gentle rubbing of the treated nuts between opposing surfaces to remove the skins, the slitting and scalding treatments so facilitating this operation that the skins are removed without breaking the nuts. The improved method embodying these steps for blanching peanuts and producing a superior product comprises a further object of the invention.

These and other features of the invention will be best understood and appreciated from the following description of a preferred embodiment thereof selected for purposes of illustration and shown in the accompanying drawings in which, Fig. 1 is a side elevation of a machine for slitting the skins on the nuts, Fig. 2 illustrates an apparatus for performing the scalding operation, Fig. 3 illustrates an apparatus for removing the skins from the slitted and scalded nuts, Fig. 4 is an end elevation of the machine shown in Fig. 1, Fig. 5 is an enlarged fragmentary view of the skin slitting mechanism, Fig. 6 is a fragmentary plan view of the conveyor shown in Fig. 1, Fig. 7 is a wiring diagram of the electric controls, and Fig. 8 is a fragmentary plan view of Fig. 3.

My nut blanching invention embodies three operations or steps, namely, slitting, scalding and skin removing and, while the order of the first two steps can be reversed, I prefer to slit the skins dry and therefore perform the slitting prior to the scalding. I shall now proceed with a description of the invention as illustrated in the drawings wherein Fig. 1 illustrates the skin slitting operation, Fig. 2 illustrates the scalding operation, and Fig. 3 illustrates the skin removing operation.

In Figs. 1 and 2, peanuts 10 are fed from a hopper 12 to an endless conveyor 14 supported on rollers 15 and 16. The top reach of the conveyor is driven from the hopper forwardly in the direction of the arrow and its outer face is grooved to provide a plurality of parallel peanut carrying troughs 18 disposed across and extending longitudinally of the conveyor. If desired the conveyor can be formed from a plurality of narrow belts providing troughs therebetween.

The conveyor 14 is driven by a motor 20 through a belt 21. A nut feeding roller 22 extends into the hopper and is driven from the motor through a belt 24. The nuts pass from the hopper onto the conveyor rearwardly of a feed roller 25 driven by a belt 26. The function of the roller 25 is to assist in arranging the nuts in the troughs 18 and permit only a single layer of nuts to pass therebeneath. The troughs are V-shaped in cross section and under the action of the roller 25 the nuts, which are of oblong shape (Fig. 6), arrange themselves longitudinally in the troughs.

Supported on a transverse bar 28 and disposed over and longitudinally of the troughs are a plurality of spring fingers 30, constructed either in one or a plurality of pieces. The fingers are slotted directly over each trough and extending downwardly through each slot and cooperating with its trough is a thin slitting blade 32. The blades are carried on the free ends of arms 33 mounted on a transverse shaft 34. The weight of the arms normally maintains the blades in the nut engaging and slitting position illustrated in Fig. 1 or they may be spring loaded if desired. In their extreme downward position, illustrated in Fig. 5, the arms abut against the fingers 30 which serve as a stop.

In Fig. 2 the forward portion of a spiral conveyor 36 is disposed beneath the delivery end of the conveyor 14 to receive the slitted nuts therefrom. The conveyor 36 is rotatably supported within a tubular casing 38 within a housing 40. The bottom wall of the housing is inclined downwardly toward a liquid holding reservoir 42 at one end and the casing 38 is perforated to permit passage of the liquid therethrough. A scalding bath is provided in the reservoir to the level of an overflow pipe 44 and the bath is electrically heated at 46. A spray 48 of hot fresh water under the control of a solenoid operated valve 50 is provided for the nuts at the delivery end of the conveyor.

Efficient scalding of the nuts requires a predetermined bath temperature and means is provided for automatically maintaining this temperature and operating the machine only when it is thus maintained, all as hereinafter described. The conveyor 36 is rotated by a motor 52 in a direction to pass the nuts through the bath and upwardly of the casing to a chute 56. The spray 48 washes the scalded nuts and supplements the bath.

As shown in Fig. 3, the forward portion of an endless conveyor 58 is disposed beneath the delivery end of the chute 56 to receive the scalded nuts therefrom. This conveyor is carried on rolls 60 and is driven through a belt 61 from a motor 62. Disposed in spaced relation over and parallel with the top reach of the conveyor is an aluminum plate 64. The rear end of this plate is supported on two rods 65 extending loosely through a supporting bracket 66. The forward end of the plate is attached to a head 68 integral with the bottom end of a vertical shaft 69. The shaft extends upwardly through a fixed horizontal plate 70 disposed transversely of the conveyor. The shaft is mounted eccentrically within a member rotatably mounted on the plate 70 and rotated by a belt 75. The arrangement is such that rotation of the shaft 69 oscillates the forward end of the plate 64 transversely and reciprocates the plate longitudinally.

The bottom face of the plate 64 is cushioned and faced with a nut-engaging fabric 72 wound on two rolls 74 and 76 at the ends of the plate. One end of the fabric strip is attached to a supply roll at 74 and the other end is connected to a wind-up roll at 76 provided with a hand crank 78. Thus the fabric can be renewed or changed merely by rotating the crank. It will be understood that the plate 64 is adjusted to a vertical position to engage the peanuts with suitable skin removing pressure between the fabric facing and the conveyor.

In Fig. 7 I have illustrated a wiring diagram of the electrical controls. The bath heating coil 46 is in a circuit provided with a switch 99 operated by a thermostat 96 in the bath 42, the thermostat being adapted to open this heating circuit when the bath reaches the predetermined scalding temperature. The other circuit shown in Fig. 7 includes a solenoid operated valve at 50 and motors 20, 52 and 62. A switch 85 in this circuit operated by a thermostat 98 in the bath is adapted to break the circuit should the bath drop below the predetermined blanching temperature. Thus the skin slitting, scalding and removing operations are carried on automatically and always at the proper scalding temperature. The thermostatically controlled switch mechanisms are not illustrated in detail since such mechanisms are well known.

The steps of the process as illustrated in the drawings are briefly as follows. Nuts feed from the hopper 12 onto the conveyor 14 and the feed roller 25 causes them to become arranged longitudinally in the troughs 18. As the nuts pass beneath the spring fingers 30 the blades 32 engage and slit the skins from end to end. The slitted nuts then feed directly to the bath 42 and the spiral conveyor 36. The nuts are preferably subjected to the slitting knives in dry condition since the slitting is more efficient on dry skins and the dry skins do not cling to and gum-up the knives and slitting mechanism. Also the skins are preferably removed immediately following the scalding treatment and before the tannic acid brewed from the skins has had time to penetrate the nuts. The conveyor conducts the nuts through the scalding bath held at predetermined temperature and the speed of the conveyor is such that the nuts are subjected to a scalding treatment for a specific time period sufficient to penetrate and loosen the skins but not sufficient to penetrate and soak the nuts. This treatment results in dry and firm nuts having a crunchy texture and a superior glossy appearance. The bath employed is hot water approximately at boiling temperature and the time period required at this temperature approximates one minute. More specifically, I preferably employ a bath temperature exceeding 200° F. and a time period approximating slightly less than one minute. It will be understood however that the time period necessarily increases with decrease of bath temperature and vice versa. As the nuts leave the bath the hot fresh water spray at 48 washes off any loose skins and foreign matter and leaves the nuts clean, and the hot spray continuously supplements the bath. The hot bath becomes saturated with tannic acid from the skins and the spray removes this acid which would otherwise turn the peanuts pink in color and bitter in taste.

The scalded nuts are delivered by the conveyor 36 directly to the conveyor 58 which conducts them beneath the rubbing plate 64 which plate is positioned to engage with suitable pressure the nuts between the fabric facing 72 and the conveyor, suitable cushion backing also preferably being provided between the facing 72 and the plate 64 to provide gentle pressure and action on the nuts. The oscillating motion of the rubbing plates together with slight vertical movement permitted by a spring loosens the skins and removes them from the nuts. The relatively light skins can be separated from the nuts in any suitable manner. It is particularly pointed out that the slitting of the skins from end to end of the nuts frees the skin along the entire length of the nut and thereby permits complete removal of the skins, whereas a sidewise or haphazard slitting of the skins would not thus free the hulls and would result in portions of the skins remaining on the nuts and the necessity for a harsher rubbing treatment tending to break the nuts.

Having thus disclosed my invention what I claim as new and desire to secure by Letters Patent is, 1. A method of blanching peanuts which consists in slitting the skins on the peanuts from end to end of the peanuts, passing the slitted peanuts through a water scalding bath approximating boiling temperature for a period approximating one minute, spraying the slitted and scalded peanuts with hot water as they emerge from the bath, and gently rubbing the slitted, scalded and sprayed peanuts to remove the skins without breaking the peanuts.

2. A method of blanching shelled nuts which consists in slitting the skins on the nuts from end to end thereof, subjecting the slitted nuts to a scalding hot water treatment approximating boiling temperature and for a predetermined time period sufficient to penetrate and loosen the skins without penetrating and soaking the nuts and including the spraying of the slitted nuts with the hot water, and gently rubbing the slitted, scalded and sprayed nuts to remove the skins without breaking the nuts.

PHILIP GREEN.

REFERENCES CITED

The following references are of record in the file of this patent:

UNITED STATES PATENTS

| Number | Name | Date |
|---|---|---|
| 1,350,506 | Kennedy | Aug. 24, 1920 |
| 1,756,497 | Warren | Apr. 29, 1930 |
| 1,979,384 | Harbaugh | Nov. 6, 1934 |
| 1,981,409 | Barra | Nov. 20, 1934 |
| 2,433,730 | Bridge | Dec. 30, 1947 |